(12) United States Patent
Molloy et al.

(10) Patent No.: US 7,788,150 B2
(45) Date of Patent: Aug. 31, 2010

(54) METHOD FOR ASSESSING RISK IN A BUSINESS

(75) Inventors: Sean Molloy, Parker, CO (US); Matthew R. Alderman, Larkspur, CO (US)

(73) Assignee: TrustWave Holdings, Inc., Chicago, IL (US)

( * ) Notice: Subject to any disclaimer, the term of this patent is extended or adjusted under 35 U.S.C. 154(b) by 698 days.

(21) Appl. No.: 11/764,000

(22) Filed: Jun. 15, 2007

(65) Prior Publication Data

US 2008/0312984 A1    Dec. 18, 2008

(51) Int. Cl.
*G06Q 40/00* (2006.01)

(52) U.S. Cl. .................. 705/35; 705/7; 705/38

(58) Field of Classification Search ............. 705/35–37, 705/7–12, 1, 38–45
See application file for complete search history.

(56) References Cited

U.S. PATENT DOCUMENTS

| | | | | |
|---|---|---|---|---|
| 6,134,706 A | * | 10/2000 | Carey et al. | 717/102 |
| 7,319,971 B2 | * | 1/2008 | Abrahams et al. | 705/7 |
| 2002/0138416 A1 | * | 9/2002 | Lovejoy et al. | 705/38 |
| 2006/0224500 A1 | * | 10/2006 | Stane et al. | 705/38 |

OTHER PUBLICATIONS

Evans, G and S. Benton, "The BT Risk Cockpit-a visual approach to ORM", BT Technology Journal, vol. 25 No. 1 Jan. 2007(13 pages).*

* cited by examiner

*Primary Examiner*—James P Trammell
*Assistant Examiner*—Elda Milef
(74) *Attorney, Agent, or Firm*—Merchant & Gould P.C.

(57) ABSTRACT

Embodiments of the invention are directed to systems and methods for determining risk associated with a business. The risk determination calculates risk with one or more policy controls associated with one or more business objects in a business object tree. Risk calculated for the policy controls is rolled-up to a business object using an algorithm that does not dilute the risk associated with the policy controls. Likewise, the risk for a business object is rolled-up to the parents of the business object. Risk is finally rolled-up to a highest order business object, which represents the risk associated with the business.

20 Claims, 11 Drawing Sheets

METHOD FOR ASSESSING RISK IN A BUSINESS

BACKGROUND

Organizations, such as business corporations, generally operate in uncontrolled market environments. The market environments involve risk. Understanding and mitigating risk is generally an important objective of businesses. However, understanding the risk faced by most business can be hard to determine. Generally, current methods for determining risk dilute the risk and provide errant data to business managers. As such, businesses often have a false sense of security, became complacent, and/or fail to act when needed. The lack of real risk evaluation prevents businesses from properly addressing risk.

It is with respect to this general environment that the present invention, as embodied in the attached claims, is contemplated.

SUMMARY

Embodiments of the present invention relate to systems and methods for determining risk faced by an organization. In embodiments, the risk associated with one or more deficiencies associated with a business object in a business object tree are calculated. The risk associated with the deficiencies is, in embodiments, rolled-up to the associated business objects using a risk mean calculation. If a business object has one or more children business objects, the risk associated with the children business objects and the risk associated with the one or more deficiencies is rolled-up to the business object using a residual risk calculation. In further embodiments, the risk is rolled-up to each higher order business object in the business object tree until each business object has a calculated risk. The risk for the highest order business object may be considered the risk for the business.

This summary is provided to introduce a selection of concepts in a simplified form that are further described below in the detailed description. This summary is not intended to identify key features or essential features of the claimed subject matter, nor is it intended to be used to limit the scope of the claimed subject matter.

BRIEF DESCRIPTION OF THE DRAWINGS

Embodiments of the invention are hereinafter described with reference to the attached figures and drawings, where like reference numerals represent like items. A brief description of the drawings is as follows.

DETAILED DESCRIPTION

This disclosure will now more fully describe some embodiments with reference to the accompanying drawings, in which only some of the possible embodiments are shown. Other aspects may be embodied in many different forms and should not be construed as limited to the embodiments set forth herein. Rather, these embodiments are provided so that this disclosure will convey the scope of the possible embodiments to those skilled in the art.

Embodiments of the present invention are generally related to systems and methods that determine risk for organizations. Generally, the systems and methods generate a model of the organization and a model of the one or more policies that apply to any part of the organization. The two models are associated. In embodiments, an algorithm or other method is used to analyze the organizational model and the associated policy model to determine which policy controls apply to which parts of the organization. The policy controls, when enacted, are referred to as applicable controls. If an applicable control is deficient, the deficiency presents a measurable risk to the organization. The risk for deficiency(ies) is then measured across the model of the organization.

Hereinafter, the organization described will be a business, but one skilled in the art will note that embodiments can be applied to other entities and organizations. In embodiments, a business is modeled as one or more business objects in a directed cyclical graph called a business object tree. A business object may be any unit of the business (e.g., finance department, accounting, information technology, etc.), an asset of the business (e.g., a building, a server computer, networks, machinery, etc.), an employee (e.g., the chief executive officer, the director of security, a factory worker, etc.), vendors, business processes (e.g., security procedures, power loss recovery procedures, product assembly methods, etc.), or any other business related item. The business object tree, in embodiments, is a hierarchical model or description of two or more business objects that represents relationships between the two or more business objects. In embodiments, a directed cyclical graph is a data structure comprising one or more objects having relationships described by directed links and also including cyclical or interdependencies between objects. An object, in embodiments, is a software or data structure comprising data.

Figure 1:
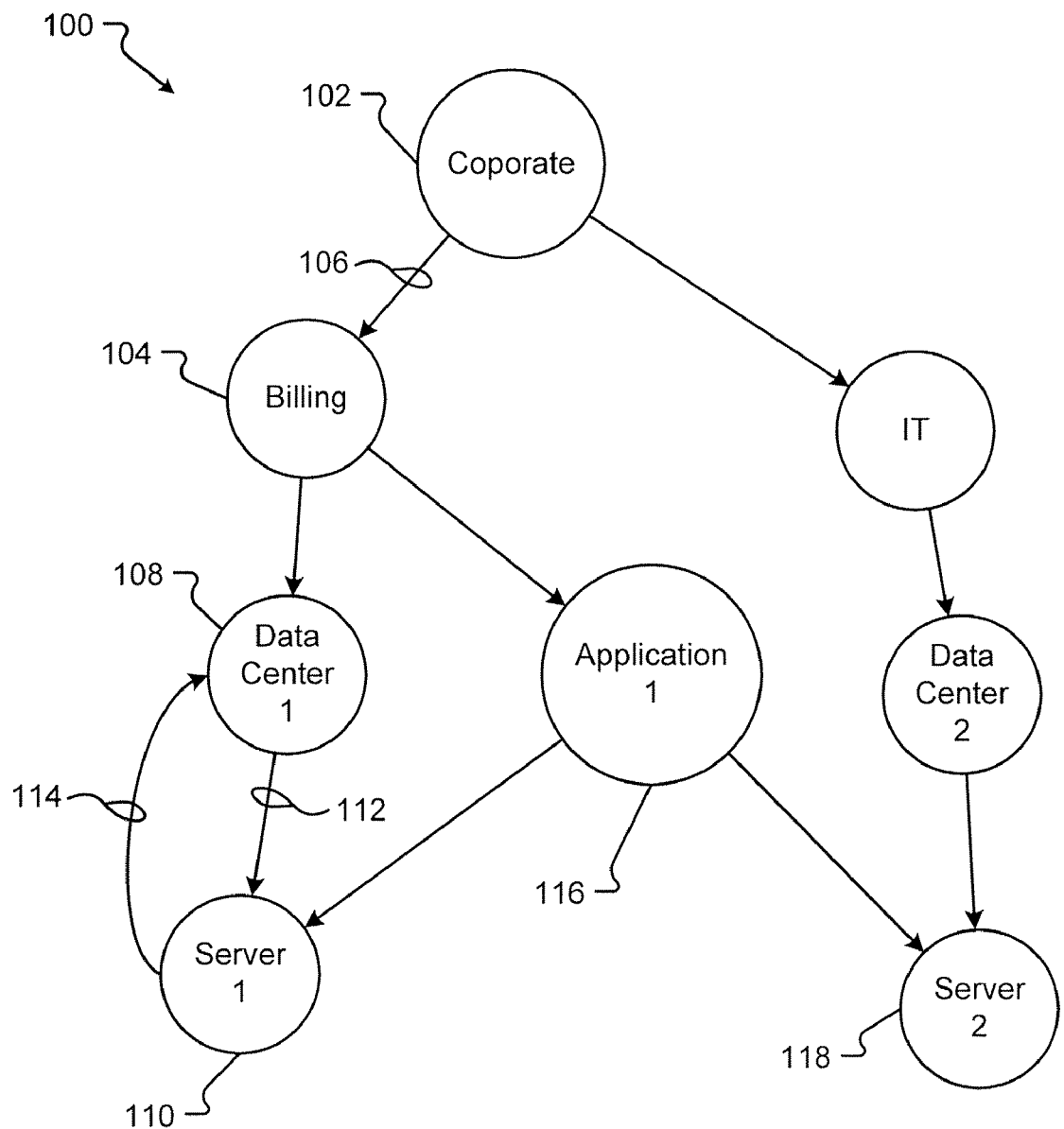
FIG. 1 is a block diagram of an embodiment of a business object tree that may be traversed to determine policy controls associated with one or more business objects.

An embodiment of a business object tree 100 is shown in FIG. 1. In embodiments, the business object tree 100 has one or more nodes. A node is an entity in the business object tree and, in embodiments, the nodes represent business objects. For example, node 102 represents a corporate object. A node can have a relationship to one or more other nodes. For example, a node may be a child node (i.e., dependent on a higher order node) or a parent node (i.e., one or more lower order nodes depend on the node). A higher order node is any node above a selected node but linked to that selected node. In contrast, a lower order node is any node below the selected node that is linked to the selected node. Higher order nodes may also be referred to as ancestor nodes, while lower order nodes may be referred to as descendant nodes. For example, the corporate object 102, in the embodiment shown in FIG. 1, is the top node or the highest order business object node and represents the business as a whole. All other nodes in the business object tree 100 are descendant nodes of the corporate object 102 or are lower level nodes to the corporate object 102.

In embodiments, each node or object in the business object tree 100 is defined by one or more items of data in a database or data element. The data may include, but is not limited to, a name or identification of the business object, an identification of the type of object (e.g., location, department, server, employee, etc.), and/or a list of user-defined attributes or values. In one embodiment, a business impact factor is an attribute that represents the importance of the function or business object to the business. For example, sales may be more important than human resources and have a greater business impact factor. In further embodiments, the node contains information about the nodes parent and/or children nodes. The user-defined attributes may include any information or metadata desired by the user. A user-defined attribute may be searched by a user to locate one or more business objects that have the attribute. For example, a user-defined attribute may include a country designation, such as "Bangladesh." A user could search for all business objects with the attribute "Bangladesh" and have returned a set of business objects with that attribute. For example, if a typhoon hits Bangladesh, a user could locate all business objects that may be affected by searching for the "Bangladesh" attribute. The user-defined attributes and searching by user-defined attributes allow users to create object trees that are more adapted to the user's application.

Relationships between nodes are represented by links between the nodes. For example, the corporate object node 102 is related or associated to its child node 104, the "Billing" object, by link 106. A link can provide an indication of the type of relationship between two nodes, i.e., which node is the parent object and which node is the child object. As such, a link may be "directional." In embodiments, there exists one link between two nodes or objects, but, it is possible to have further links between the same nodes if different types of relationships exist between the nodes. Each object may have a link to two or more other objects such that one node can have multiple children nodes and/or multiple parent nodes.

In embodiments, a data element in a database represents the directional link between two nodes. The data element may have one or more items of data. An embodiment of the data element includes one or more of, but is not limited to, a parent identification, a child identification, a link type, and/or a link identification. The parent identification and/or the child identification can indicate the direction of the link. The link type may indicate the relationship between the nodes and can be used to traverse the business object tree for one or more types of relationships. For example, to determine the policy controls that apply to the business' facilities, the business object tree is traversed for all links having a "facilities" type. The link types may include, but are not limited to, facilities, computers, business units, etc. As with the business object attributes, the links may be searched or traversed according to the link type. For example, to find policy controls for only the buildings in the business, only links with a link type of "facilities" could be searched. Thus, customized traversals and searches are capable using the link type attribute.

Each node in the business object tree may inherit attributes from one or more of its ancestral nodes. For example, if a policy control applies to a parent object, the policy control would also apply to its child or descendant objects. By inheriting attributes, especially the associated policy controls, each node has a complete list of required attributes or policy requirements without needing to understand the structure of the higher order nodes in the business object tree.

The business object tree, in embodiments, is a directed cyclical graph (DCG). As explained above, the links or the nodes can describe the relationship between nodes, i.e., parent and child relationships. The relationship from a parent object to child object is directional or "directed." Further embodiments of the DCG business object tree represent cyclical relationships, or interdependencies, between nodes where a parent may also be a child of its child node. For example, the data center 1 object 108 is a parent of the server 1 object 110 as represented by directional link 112. However, server 1 object 110 is also a parent of data center 1 object 108 as represented by directional link 114. This "cyclical" relationship occurs often in businesses where objects are interdependent. For example, server 1 110 may be located in data center 1 108 and be dependent on data center 1 108. Likewise, data center 1 108 may be secured by a security system that requires a card scan system provided by server 1 110. Thus, data center 1108 relies on server 1 110 and is in a child relationship with respect to server 1 110.

Figure 2:
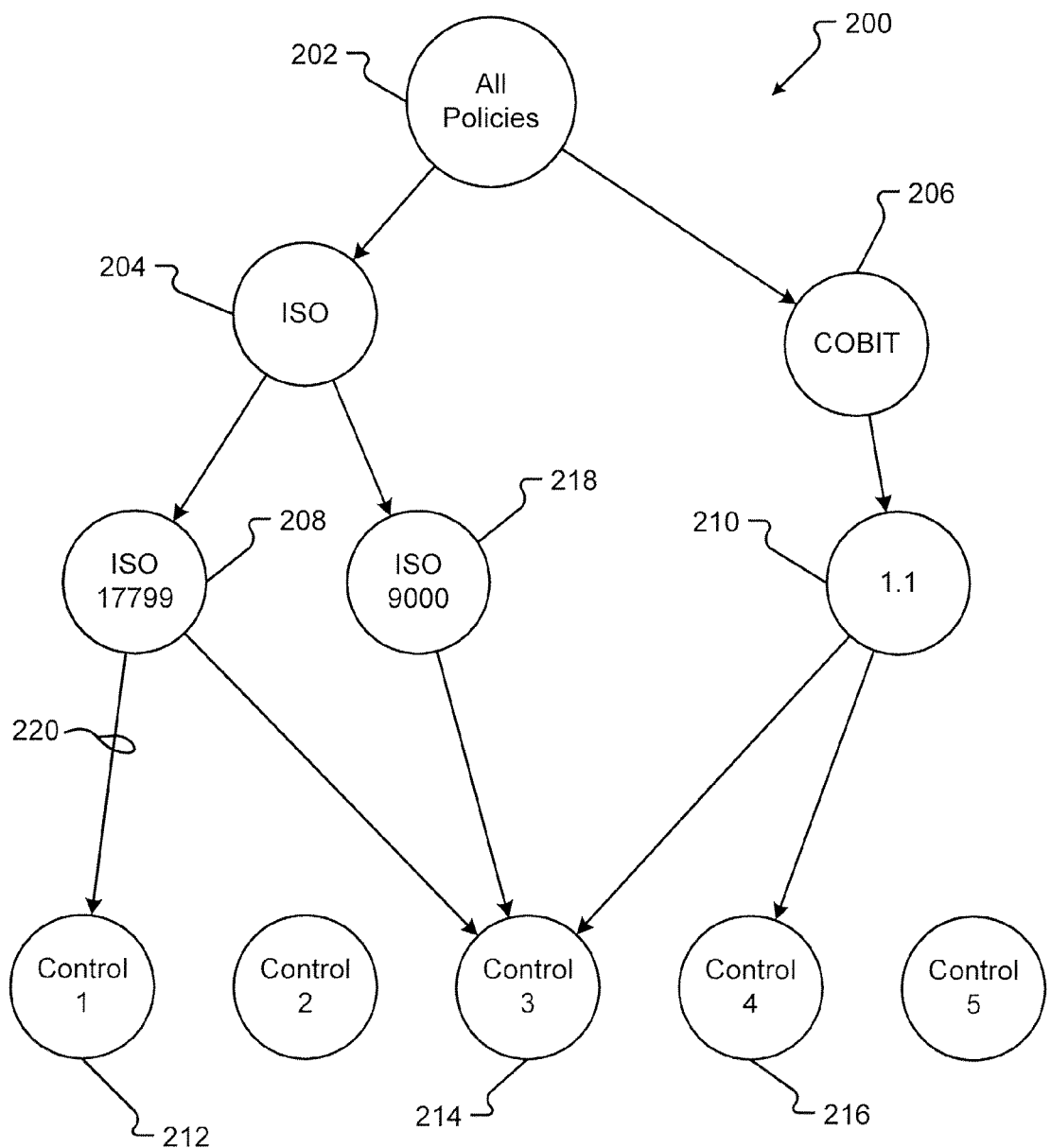
FIG. 2 is a block diagram of an embodiment of a policy object tree that may be traversed to determine policy controls associated with one or more business objects.

The policy model, in embodiments, is also a DCG called a policy object tree 200 having one or more policy objects as shown in FIG. 2. Like the business object tree 100 (FIG. 1), the policy object tree 200 can be a hierarchical model or description of one or more polices, with each policy having one or more policy objects. A policy object, e.g., the all policies object 202, in embodiments, is any grouping of policies (e.g., ISO standards policy group, COBIT, Sarbanes-Oxley Act, etc.), a discrete policy (e.g., ISO 9000, ISO 17799, etc.), or a section of a policy (COBIT section 1.1, EPA code chapters, etc.). In one embodiment, one or more policy controls, e.g., 212, 214, and 216, are the lowest level of the hierarchical policy object tree 200, and one or more policy objects are linked to or associated with the one or more policy controls, as represented by exemplary link 220.

The highest order policy object in the policy object tree 200 may be an all policies object 202. The children objects of the all policies object 202, in embodiments, are the policy type objects, for example, the ISO policy object 204 and the COBIT policy object 206. The policy type objects represent the types of policies that the business must follow. Each policy type object may have one or more policies as children objects. For example, the ISO policy type object 202 has the ISO 17799 policy object 206 as a first child and the ISO 9000 policy object 218 as a second child. Depending on the number of policies included in the group represented by the policy type object, a policy type object can have one or more children objects.

A policy object, in embodiments, may have one or more policy controls as children objects. For example, the 1.1 policy object 210 has the control 3 object 214 and the control 4 object 216 as children. A policy control object, in embodiments, represents a discrete task required by the parent policy object. One or more policy objects may share one or more policy controls. For example, the ISO 17799 policy object 208 shares policy control 3214 with the 1.1 policy object 210. In a further example, both the ISO 17799 policy object 208 and the 1.1 policy object 210 may require "Doors to be locked nightly" (policy control 3 214) as part of the respective policies.

The policy controls when enacted are considered applicable controls. In embodiments, each policy control has one or more attributes that apply to the applicable controls. In embodiments, the applicable control attributes include one or more of, but are not limited to, the different degrees of enactment for an applicable control, the strength or importance of the applicable control, and the weight given to the degrees of enactment for the applicable control. Degrees of enactment can be any scale or number of steps required to fully enact the applicable control. For example, the steps for an antivirus program may be not installed, installed, software updated, virus files updated, and automatic updates of the virus files in the future. The degrees of enactment can mimic the steps such that no installation is a first step, installation is the second step, updating the antivirus software is a third step, etc. Each of the steps can have a weight or risk. The risk may be measured linearly for each step, exponentially or in some other manner. For example, a first step may have a 100% risk, the second step may have 90% risk, the third step may have 70% risk, the fourth step may have 30% risk, etc. Thus, the further an applicable control is from full enactment the greater the risk. Finally, the strength of the applicable control is a determination of the importance of the applicable control compared to other applicable controls. For example, a policy requiring passwords to be changed every three months is not as strong as, i.e., is less important, an automatic computer function that is installed and requires the automatic changing of passwords every three months. These and other attributes are important to determining the risk encountered by the business.

As with the business object tree 100 (FIG. 1), relationships between nodes are represented by links between the nodes. For example, the ISO 17799 policy object 208 is linked to or associated with its child node 212, the control 1 object 212, by link 220. The links in the policy object tree 200 can provide an indication of the directional relationship between two nodes, i.e., which node is the parent object and which node is the child object. Each policy object may have a link to two or more other objects such that one node can have multiple children nodes and/or multiple parent nodes.

In embodiments, a data element in a database represents the link between two nodes in the policy object tree. The data element may have one or more items of data. An embodiment of the data element includes one or more of, but is not limited to, a parent identification, a child identification, and/or a link type identification. The parent identification and/or the child identification can indicate the direction of the link.

Figure 3:
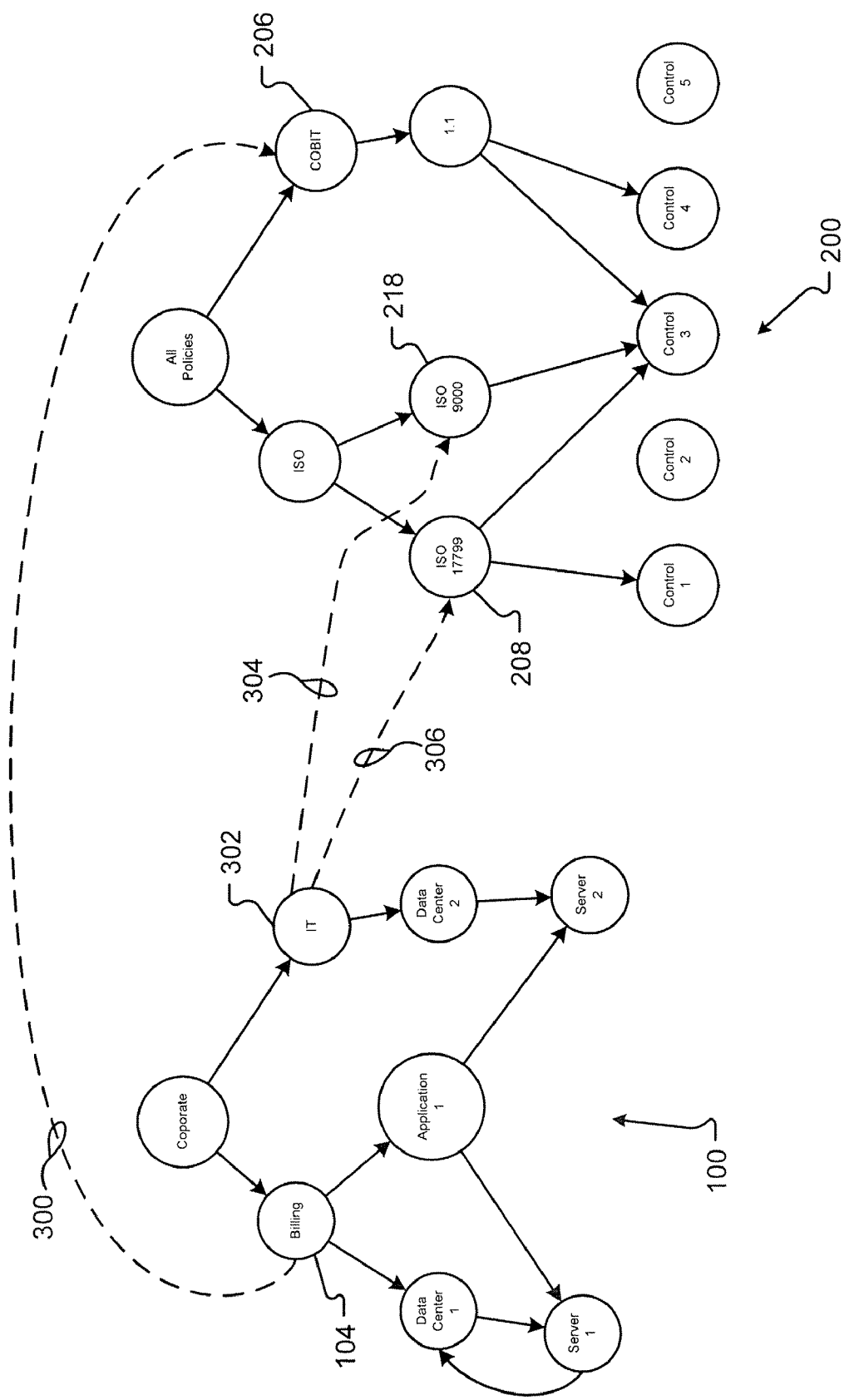
FIG. 3 is a block diagram of an embodiment of a business object tree and a linked policy object tree that together may be traversed to determine policy controls associated with one or more business objects.

The business object tree and the policy object tree are interrelated or associated in embodiments, as shown in FIG. 3. One or more objects in the business object tree may be linked to or associated with one or more policy objects in the policy object tree by one or more links. As such, the two trees are associated. For example, the billing object 104 in the business object tree 100 is associated with the COBIT object 206 in the policy object tree 200. The association or linkage between the billing object 104 and the COBIT object 206 is represented by link 300. In further embodiments, one business object has two or more links to two or more policy objects. For example, the IT business object 302 has two links 304 and 306 to two policy objects, the ISO 17799 object 208 and the ISO 9000 object 218, respectively. As such, the IT object 302 must adhere to policy controls associated with both policy objects 208 and 218.

In embodiments, the links between the business object tree 100 and the policy object tree 200 are data elements in a database, with each data element including one or more items of data. For example, the data items may include one or more of, but are not limited to, a business object identification, a policy object identification, a type, and/or an override bit. The override bit can prevent the inheritance of attributes from higher order objects. In some situations, inheriting the policy controls from ancestral nodes is inappropriate. For example, some countries may have laws that should be enacted instead of global guidelines from an international organization. In such situations, the override bit can be sent to prevent the international guidelines from being inherited from an ancestral object and only apply the laws of the country.

Figure 4:
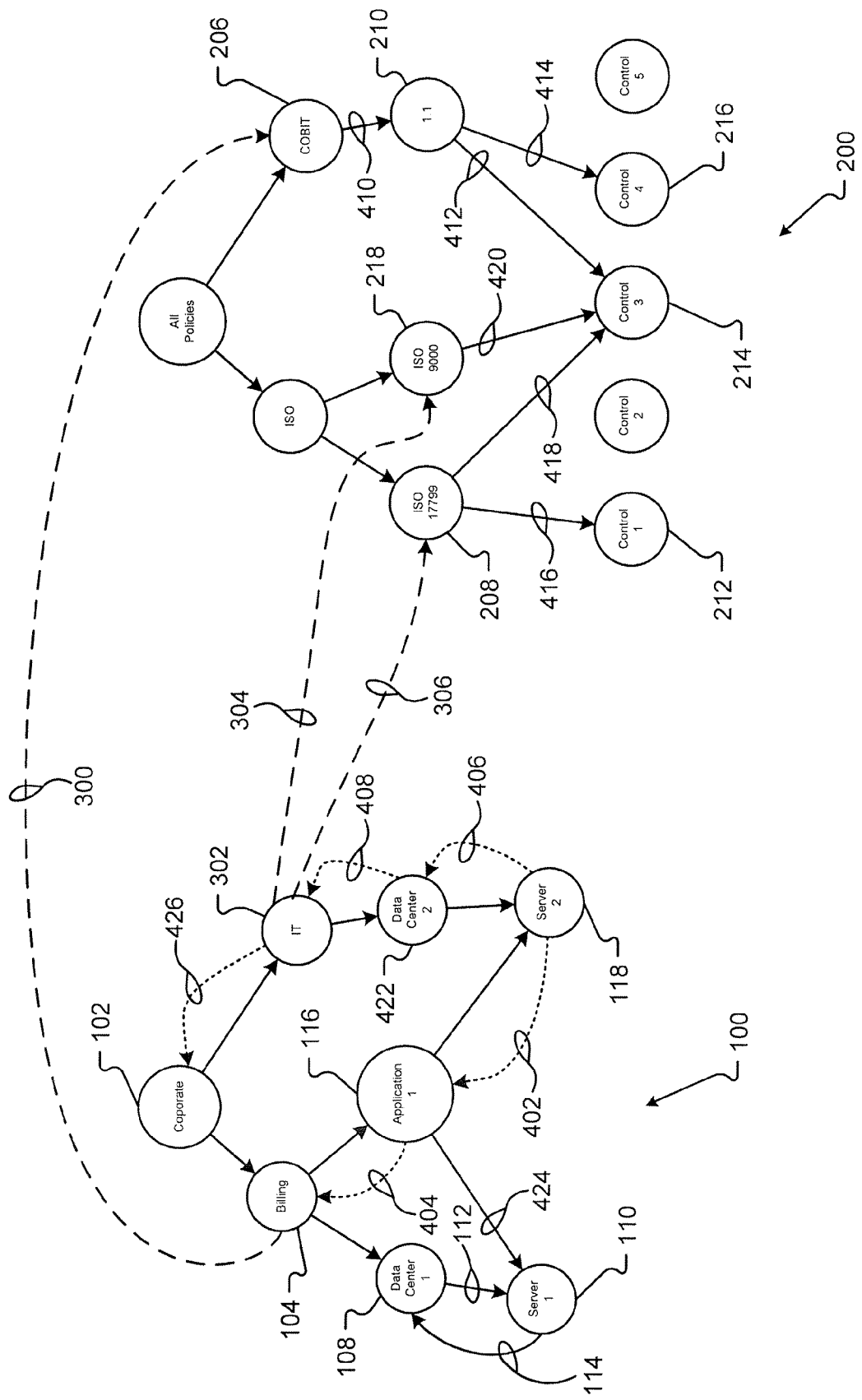
FIG. 4 is a block diagram of an embodiment of a business object tree and a linked policy object tree showing an example of a tree traversal that determines policy controls associated for a business object.

A block diagram showing a sample tree traversal is shown in FIG. 4. The business object tree 100 and the policy object tree 200 are as shown in FIGS. 1 and 2. The links 300, 304, and 306 are as shown in FIG. 3. The diagram of FIG. 4 will hereinafter be used for explaining methods 500 of FIG. 5 and method 600 of FIG. 6.

Figure 5:
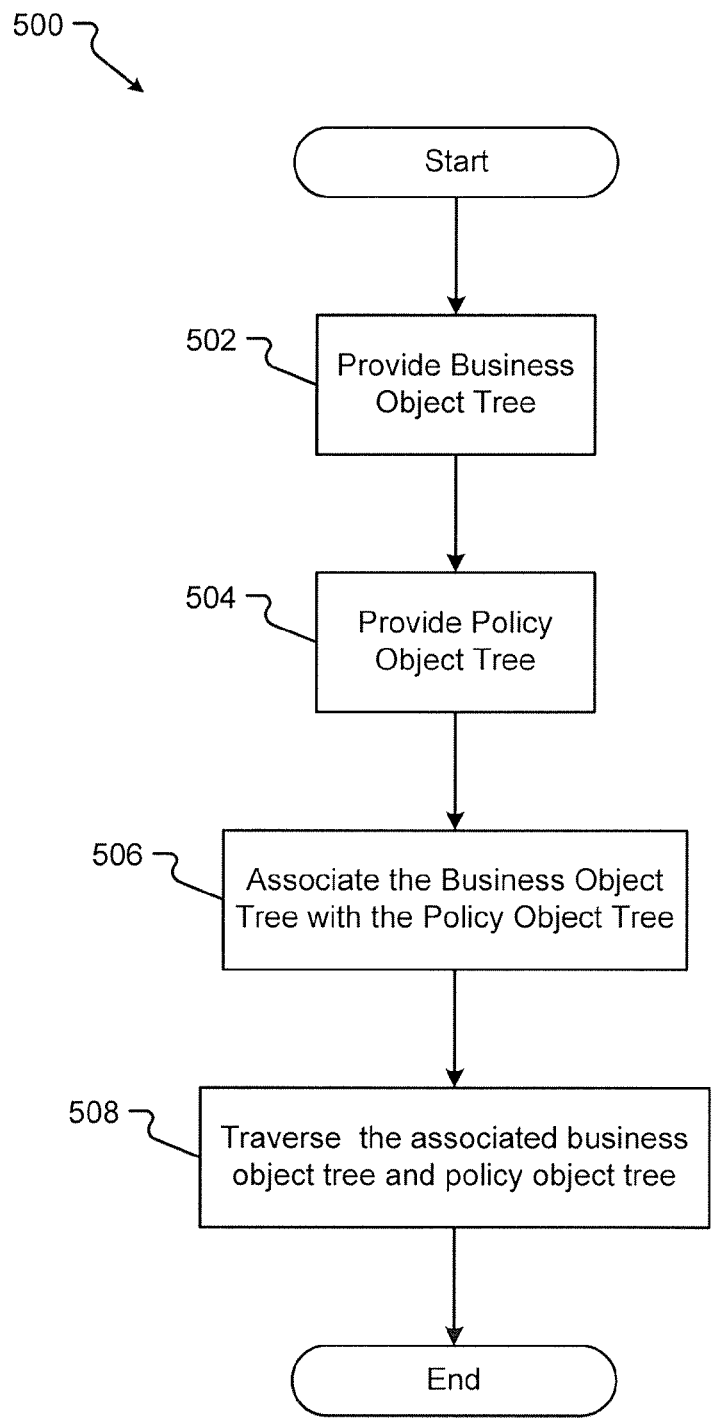
FIG. 5 is a flow diagram of an embodiment of a method for determining policy controls associated with one or more business objects.

An embodiment of a method 500 for determining policy controls associated with one or more business objects is shown in FIG. 5. Provide operation 502 provides a business object tree. The business object tree 100 (FIG. 1) is, in embodiments, as described in conjunction with FIG. 1. The business object tree 100 (FIG. 1) may be created and stored in a database. In alternative embodiments, the business object tree 100 (FIG. 1) is already stored in memory of a computer system and retrieved for tree traversal.

Figure 9:
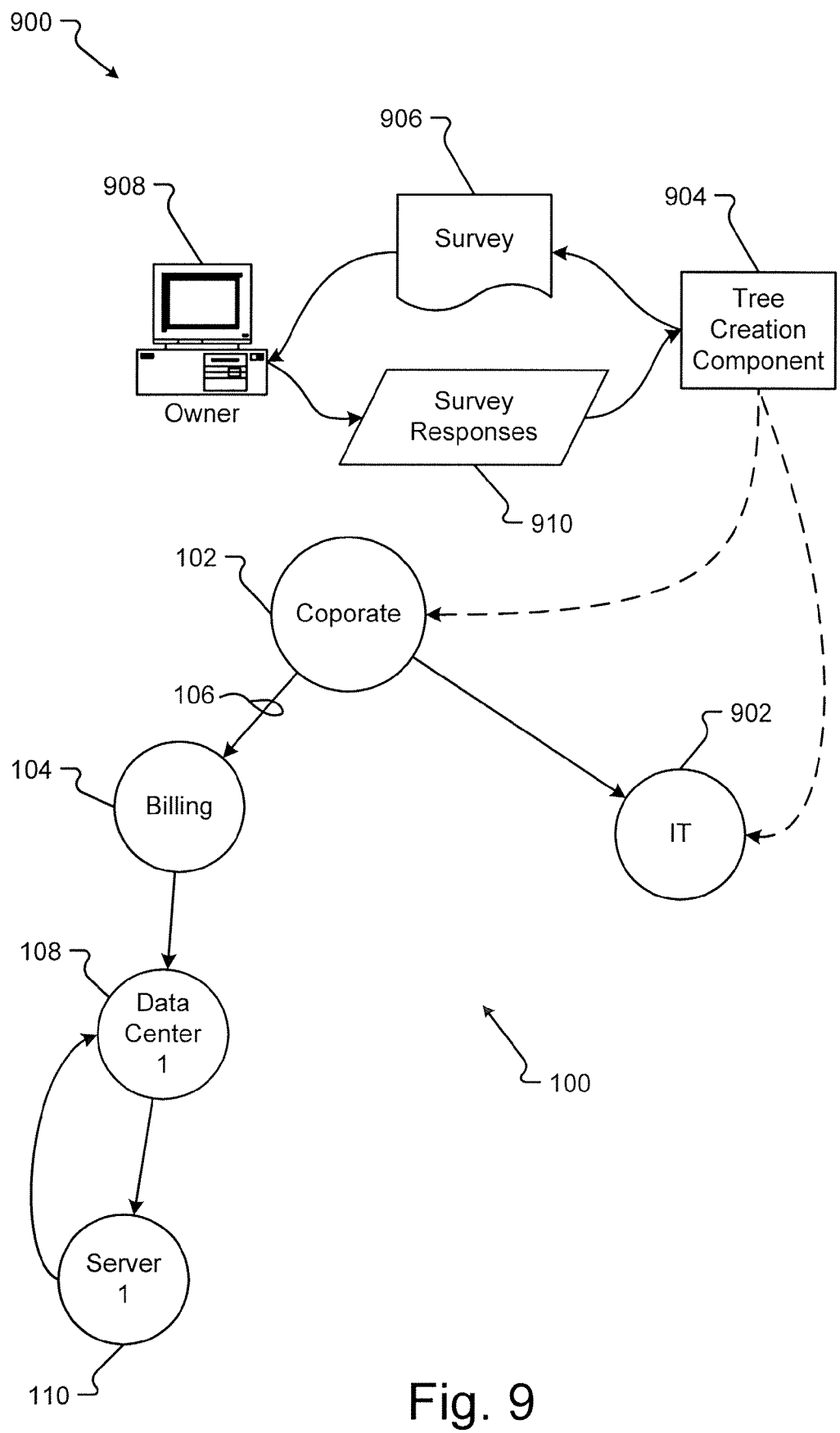
FIG. 9 is a block diagram of an embodiment of a method for creating an object tree.

A representation of a process or method 900 for creating the business object tree 100 is shown in FIG. 9. In embodiments, an object owner, such as a corporate director or manager, is given, sent or provided a survey 906 from a tree creation component 904. The owner of an object is a person who is knowledgeable about the business object in question and may have managerial responsibility for that business object. In one embodiment, the survey 906 and responses 910 are electronic, and the owner is thus represented by computer system 908. However, the surveys 906 and responses 910 may be given in paper form with the response data 910 entered into a computer system executing the tree creation component 904.

In the survey, the owner 908 of the corporate object 102, for example, the corporate director, may be asked, in the survey 906, what systems or business units that the corporation may depend or over which the corporation has control. In embodiments, the corporate director answers, in the survey responses 910, that the corporation, represented by the corporate object 102, controls the functions of the billing department and the IT department. The tree creation component 904 can then create two objects, the billing object 104 and the IT object 902, in the business object tree 900 in response to the corporate director's input. Links, such as link 106, are created to represent the relationship between the newly created objects, e.g., the billing object 104, and the corporate object 102.

The corporate director, in embodiments, describes who should be surveyed for the child objects, e.g., the billing object 104 and the IT object 902, by providing information as to the manager or owner of the business units that represent the child objects. Another survey 906 is sent to the owners 908 of the child objects. The same types of questions are asked of the billing object 104 owner 908 to create the data center 1 node 108 and, possibly, the server 1 node 110. The questions also identify the cyclical relationship between data center 1 object 108 and the server 1 object 110.

By interviewing the owners of the different business objects and forwarding surveys 906 to object owners for objects that are dependent on the higher order objects, a business object tree 900 may be generated organically and populated with information by people with the most knowledge, i.e., the object owners. In embodiments, the surveys 906 are electronic and are automatically forwarded. The response data 910 from the owners can be automatically saved, in embodiments, into a database to create the business object tree 100. In embodiments, the policy object tree 200 (FIG. 2) may be created in a similar fashion with the tree creation component 904. Further, additions or changes to the business object tree 100 may be recorded by resending the surveys 906 and noting the changes.

Provide operation 504 provides a policy object tree. The policy object tree 200 (FIG. 2) can be as described in conjunction with FIG. 2. Similar to the business object tree 100 (FIG. 1), the policy object tree 200 (FIG. 2) may be created and stored in a database or, in alternative embodiments, is already stored in memory of a computer system and retrieved for tree traversal.

Associate operation 508 associates the business object tree with the policy object tree. In embodiments, one or more links are created between one or more business objects and one or more policy objects. For example, the link 300 (FIG. 300) between business object 104 (FIG. 3) and policy object 206 (FIG. 3) is created. The one or more links may be created manually by a user by placing the business object identification and the policy object identification into a data element to create the link in a database.

Traverse operation 508 traverses the business object tree and the policy object tree to associate policy controls with one or more business objects of interest. In embodiments, the directional links between child and parent business objects, between business objects and policy objects, and between parent and child policy objects are followed until terminating at policy controls. One embodiment of a method for tree traversal is explained in conjunction with FIG. 6. In embodiments, the result of the tree traversal operation 508 is a list or group of one or more policy controls associated with one or more business objects. This group of associated policy controls may be provided to the user for help in identifying applicable policy tasks to enact. For example, a facilities manager who "owns" the responsibility for a building is provided with all the policy controls (e.g., doors must be locked at night, a card scan security system must be used, a semi-annual fire inspection must be completed, etc.) she or he must enact. The facilities manager does not need to research through several different policies to individually determine which policy controls apply to his or her building, but those policy controls are determined for the facilities manager and automatically provided.

Figure 6:
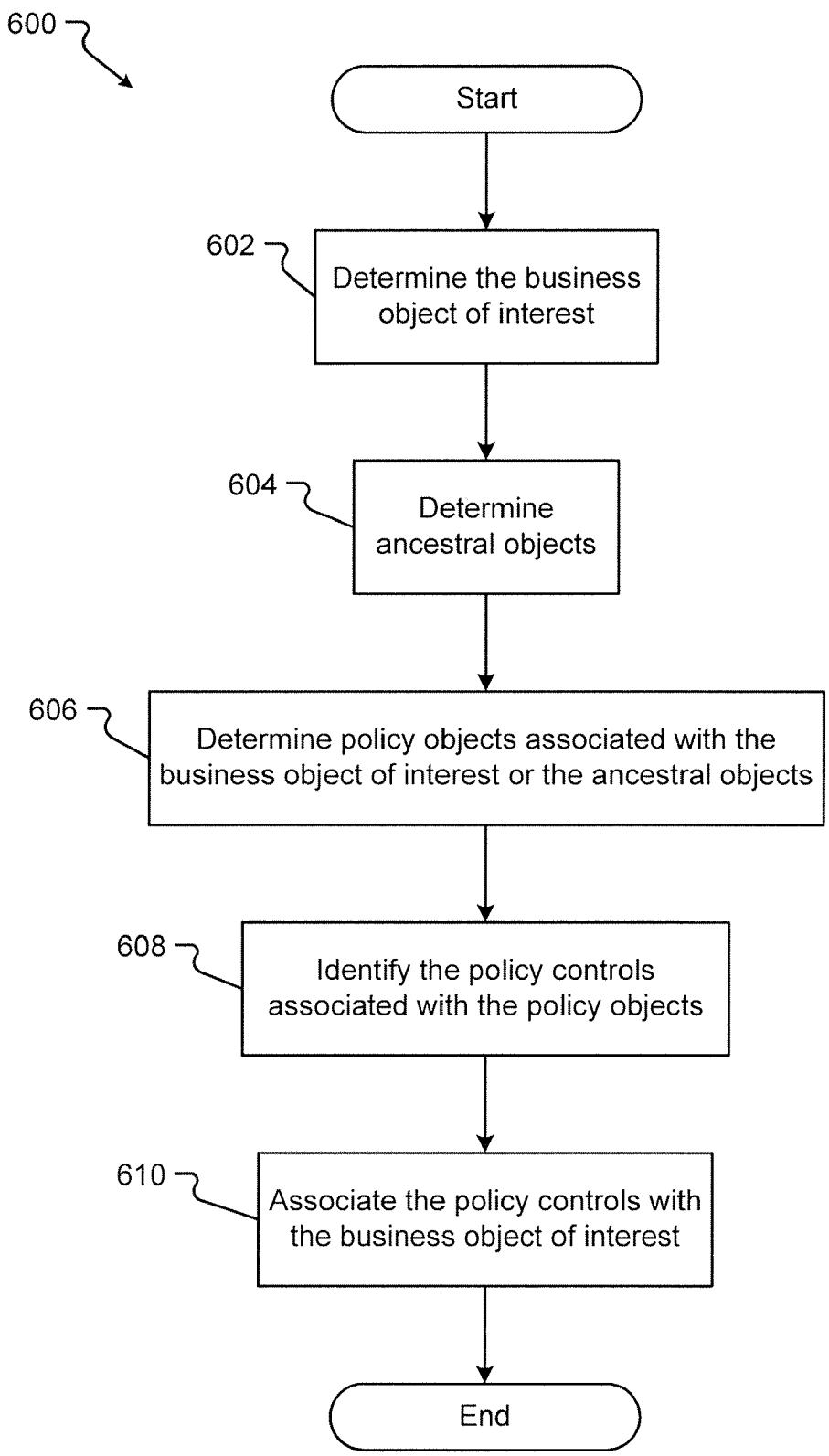
FIG. 6 is a flow diagram of an embodiment of a method for traversing a business object tree and a related or linked policy object tree to determine policy controls associated with one or more business object.

An embodiment of a method 600 for traversing a business object tree and a policy object tree to associate policy controls with one or more business object is shown in FIG. 6. In embodiments, a traversal algorithm traverses the trees to associate the policy controls with the one or more business objects. Reference will be made to the business object tree and the policy object tree shown in FIG. 4 to better explain the embodiment of the method 600. In embodiments, determine operation 602 determines the one or more business objects of interest in the business object tree. Hereinafter, only one business object of interest will be described, but one skilled in the art will recognize how to expand the tree traversal to include more than one business object of interest. A business object of interest is any object that a user selects to designate that he or she desires to know what policy controls apply to that business object. In embodiments, the user enters, in a graphical user interface, the business object identification for the business object of interest.

Determine operation 604 determines one or more ancestral objects to the business object of interest. An ancestral object, in embodiments, is any higher order object that is associated with an object through one or more directional links whose direction is from child to parent. For example, a parent object is an ancestral object to the children of the parent object. Likewise, the grandparent objects of the children object are also ancestral objects, but a sibling object is not an ancestral object.

Referring to FIG. 4, the server 2 object 118 has five ancestral objects. The applications 1 object 116 and the data center 2 object 422 are both parent objects to the server 2 object 118 and are ancestral objects to the server 2 object 118. Further, the billing object 104 and the IT object 302 are both ancestral objects because both objects are grandparent objects to the server 2 object 118. The corporate object 102 is an ancestral object because it is a great grandparent object to the server 2 object 118. In contrast, the server 1 object while "related" is not an ancestral object because it is a sibling object. Sibling objects do not have a link that is in the proper direction, that is, from child to parent. Rather, the link to a sibling is from parent to child. For example, the link from the server 2 object 118 to the application 1 object 116 is child to parent. Yet, while the server 1 object is linked to the application 1 object via link 424, link 424 is in the wrong direction; that is, link 424 goes from the parent object, the application 1 object 116, to the child object, the server 1 object 110. Thus, the server 1 object 110 is a sibling to the server 2 object 118 and not an ancestral object.

In embodiments, some business objects have cyclical relationships where a child object is also a parent of its parent object. For example, as shown in FIG. 4, the data center 1 object 108 is the parent of the server 1 object 110 as represented by link 112. Yet, the server 1 object 110 is also the parent of the data center 1 object 108 as represented by link 114. In these cyclical relationships, it is harder to identify the ancestral object because both the server 1 object 110 is a parent of the data center 1 object and the data center 1 object 108 is a parent of the server 1 object 110. Thus, the traversal algorithm must determine, in the cyclical relationships, which object is the ancestral object. After determining that there is a cyclical relationship because of the unique parent and child relationship between two objects, the traversal algorithm, in embodiments, determines if one of the objects has another parent object. For example, the data center 1 object 108 has the billing object 104 as a parent. The object with other parent object, e.g., the data center 1 object 108, is considered the ancestral object.

After traversing a link, the link, in embodiments, is coded to indicate that link has been traversed, also referred to as "coloring the link." In embodiments, an indicator flag or other data element is set to show the link has already been traversed. Coloring the link prevents the traversal algorithm from getting caught in an infinite cycle when trying to traverse cyclical relationships in the business object tree 100.

For example, if the server 1 object 110 is the business object of interest, the traversal algorithm would traverse the link 112 from the server 1 object 110 to the data center 1 object 108. After traversing the link 112, the link would be "colored." Then, the traversal algorithm would recognize link 114 is in the correct direction, from child to parent, and would traverse the link back to server object 1 110. Link 114 would also be colored. The traversal algorithm may then try to traverse link 112 again. However, link 112 was colored. As such, the traversal algorithm would be prevented from traversing link 112 again.

Determine operation 606 determines policy objects related with either the lowest order object or its ancestral objects. In one embodiment, the traversal algorithm searches for links between the business object of interest or its ancestral objects and one or more policy objects. For example, the billing object 104, in FIG. 4, has a link 300 to the COBIT policy object 206. In finding the links between the business objects and the policy objects, the traversal algorithm locates the one or more associated policy objects in the policy object tree 200.

Identify operation 608 identifies the one or more policy controls associated with the located policy objects. A traversal of the policy object tree, in embodiments, identifies the associated policy controls. As shown in the example in FIG. 4, the policy object tree 200, is traversed from parent to child (i.e., in the opposite direction of the traversal of the business object tree 100) to find the lowest order objects, which are the policy controls in the policy object tree 200. For example, the COBIT policy object 206 has a link 410 which is traversed to the 1.1 policy object 210. Then, links 412 and 414 are traversed to control 3 214 and control 4 216, respectively. Thus, two policy controls are identified for the COBIT policy object 206.

Associate operation 610 associates the identified or determined policy controls with the business object of interest. For example, after the traversal of the business object tree 100 and the policy object tree 200 shown in FIG. 4, one or more policy controls are determined to relate to one or more business objects. In embodiments, the determined policy controls are associated with the business object of interest with a data element in a database. The data element may have the identification of the business object of interest and one or more pointers to the one or more policy controls associated with the business object of interest.

In further embodiments, there may be one or more duplicate policy controls associated with the same business object. For example, the ISO 9000 policy object 218 and the 1.1 policy object 210 both link to control 3 214. As such, if a tree traversal occurs from both the ISO 9000 policy object 218 and the 1.1 policy object 210, then two instances of control 3 214 would be related to a business object. However, after all policy controls are determined, the traversal algorithm can eliminate the one or more duplicate controls and maintain one associated policy control with the business object of interest.

In still further embodiments, the policy controls may have one or more attributes. For example, each policy control may have an attribute designating a type of policy control and only predetermined types of policy controls apply to predetermined business objects. The policy controls and the policy control attributes, including the type attribute, may be provided in a policy control applicability table, explained in conjunction with FIG. 7. A business object representing a building may have an attribute designating it as a "facilities" type business object. After the tree traversal, several controls may be identified or determined for the building business object. However, only those policy controls with the "depends on" type of "facilities" would be associated with the building business object and those not related to "facilities" would be deleted. For example, a policy control to lock the doors at night would be associated with a building business object, but a policy control to change passwords for a server system would not be associated with the business building object although the password policy control may be identified for the building business object. In alternative embodiments, each link between the business objects and the policy object has a type and only those links with a predetermined type are traversed. The links to certain policy controls also would have, in the example, a type attribute representing the applicability of the policy control to one or more business objects. As such, only those policy controls with the predetermined type would be identified rather than identifying all policy controls and only associating the correct type of policy control.

To further illustrate how the policy controls are related to the business objects, an example shown in FIG. 4 will hereinafter be explained. The server 2 business object 118 is determined to be the business object of interest selected by the user. Links are traversed from the server 2 object to its ancestral objects starting with the parent objects, the application 1 object 116 and the data center 2 object 422. The traversal of the links to the parent objects is represented by arrow 402 and 406, respectively. The application 1 object and the data center 2 object are determined to be ancestral objects. Further ancestral objects are then determined.

The IT object 302 is an ancestral object and traversed as evidenced by traversal 408 and the billing object is also an ancestral object as evidenced by traversal 404. The corporate object 102 is also an ancestral object, as represented by traversal 426. There are no other links that have a direction from child to parent in the chain of links between objects, and thus, no other ancestral objects are determined. The ancestral objects are found, notably, the data center 2 object 422, the application 1 object 116, the billing object 104, the IT object 302, and the corporate object 102. Any associations between any one of the ancestral objects or the server 2 object and a policy object can now be determined.

Only two objects from the group of ancestral objects or the business object of interest have links to the policy object tree. The billing object 104 is linked to the COBIT policy object 206 and the IT object 302 is linked to both the ISO 9000 object 218 and the ISO 17799 object 208. From these determined policy objects, the policy object tree 200 may be traversed. The policy controls associated with the COBIT policy object 206, the ISO 9000 object 218, and the ISO 17799 object 208 are determined. The links between the policy objects and the policy controls is traversed. In traversing the policy object links, three policy controls are determined to be associated with the COBIT policy object 206, the ISO 9000 object 218, and the ISO 17799 object 208. The COBIT policy object 206 is associated with policy control 3 212 and policy control 4 214; the ISO 17799 object is associated with policy control 1 and policy control 3; finally, the ISO 9000 policy object is associated with policy control 3. As such, there are one instance of policy control 1 associated with the server 2 object 118, three instances of policy control 3 associated with the server 2 object 118, and one instance of policy control 4 216 associated with the server 2 object 118. There are two duplicate instances of policy control 3 214, which are deleted. Therefore, the server 2 object 118 is associated with policy control 1 212, policy control 3 214 and policy control 4 216. This group of associated policy controls may be provided, by displaying or outputting the group of policy controls, to the user to enact the policy controls.

Figure 7:
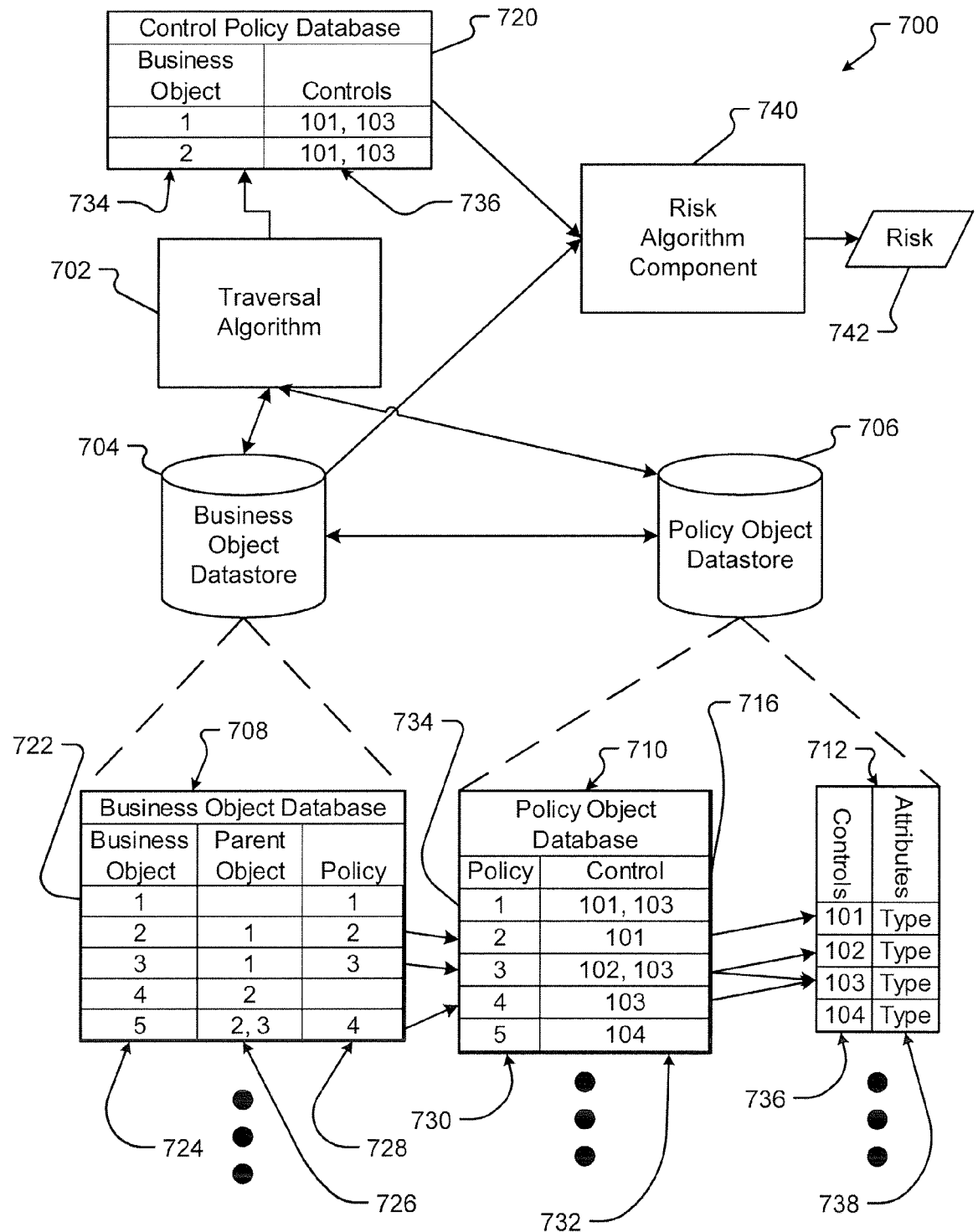
FIG. 7 is a block diagram of a software system for traversing business object trees and related policy object trees to determine policy controls associated with one or more business objects.

An embodiment of a software system 700 operable to associate policy controls with business objects is shown in FIG. 7. In embodiments, a traversal algorithm 702, similar to the traversal algorithm explained in conjunction with FIG. 6, accesses a business object datastore 704 and a policy object datastore 706. From the business object datastore 704, the traversal algorithm retrieves a business object database 708, which may include one or more data elements, e.g., data element 722, that have one or more data values. In one embodiment, each data element includes a business object identification 724, a parent object identification 726, and an identification of an associated policy object if applicable. In embodiments, the business object database 704 contains the business object tree 100 (FIG. 1) and the policy object database 706 contains the policy object tree 200 (FIG. 2).

The traversal algorithm 702 can traverse the business object tree, as represented by the business object database 708, as explained in conjunction with FIG. 6. Parent objects for a business object of interest are determined by traversing the parent object links represented by the parent object identification 726 to create lists of ancestral objects. Once a list of ancestral objects is created, the traversal algorithm traverses the links, represented by the policy object links 728 to the policy object tree, as represented by policy object database 710 stored in the policy object datastore 706.

The policy object database 710 includes one or more data elements, e.g., data element 734, which each may have one or more data values for a policy object identification 730 and a pointer or link to a policy control 732. Another database element, in embodiments, is the controls group 712 that may also be stored in the policy object datastore 706. The link or pointer 732 in the policy object database 710 may point to the controls group 712. The policy object database 714 can be traversed to find a group of controls associated with each policy object of interest.

In alternative embodiments, the policy control group 712 represents a policy control applicability table 712. Both the policy controls 736 and one or more policy controls attributes 738 are contained within a policy control applicability table 712. An attribute 738 of the policy control 736 may be the type of attribute. The type of the attribute may function to associate only policy controls of a predetermined type with predetermined business objects.

Upon determining the policy controls, the traversal algorithm, in embodiments, provides and/or displays a control policy database or data element 720 that associates the business object identification number 734 with one or more policy controls 736. The control policy database 720 may be provided to the user to identify the policy tasks or controls for which each owner of the business objects is responsible. Further, the control policy database 720 associates the deficiencies, while being enacted, with the business objects. The control policy database 720 may also include attributes, such as the risk value for the deficiency or the strength (control effectiveness value) of the deficiency. The risk value and strength can calculate a risk associated with the deficiency.

In alternative embodiments, a series of links between nodes is saved in a datastore with the same information as presented in the one or more databases in FIG. 7. For example, a link may contain a simple syntax, for example, "business object: parent object: policy object association: override: type." Instead of searching the information in the databases, the traversal algorithm 702 uses the data from the links as one skilled in the art will recognize.

In further embodiments, a risk algorithm component 740 determines a risk for the business. The risk may be associated with one business object in the business object database 708, a group of business objects, or the business as a whole, which is represented by a corporate business object 102 (FIG. 1). In embodiments, the risk algorithm traverses the business object database 708 and the control policy database 720 to determine risks associated with the deficiencies (also referred to as policy controls). The risks associated with the deficiencies are inherited by the business objects for which the deficiencies relate. The risks associated with children business objects are inherited by parent business objects. In embodiments, the risks are "rolled-up" to higher order business objects until a risk for a highest order business object is determined. The risk 742 for the highest order node is the risk 742 for the business. Methods executed by the risk algorithm component 740 are described in conjunction with FIG. 10 and FIG. 11.

Figure 8:
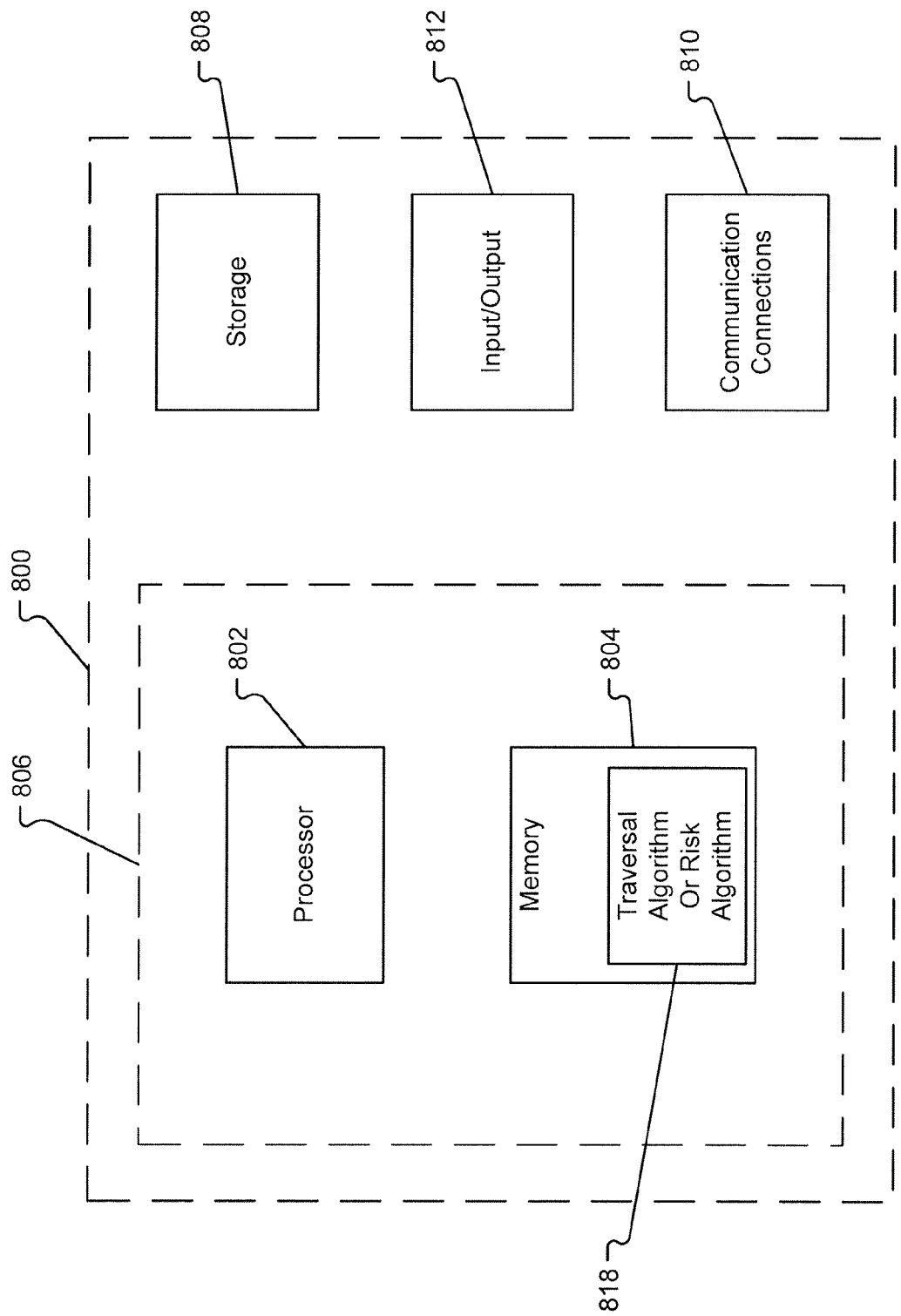
FIG. 8 is a block diagram of a computer system operable to execute a traversal algorithm.

With reference to FIG. 8, an embodiment of a computing environment for implementing the embodiments described herein is shown. In one embodiment, the traversal algorithm 702 (FIG. 7) is a process executed in a computing system 800 such as a server, desktop, laptop, handheld device, or other computing system. Embodiments of the computer environment for the traversal algorithm 702 (FIG. 7) include a computer system, such as computer system 800.

In its most basic configuration, computer system 800 typically includes at least one processing unit 802 and system memory 804. In embodiments, a traversal algorithm component or risk algorithm component, generally indicated by 818, is loaded into memory 804 and run by the processing unit 802 from system memory 804 of a computer. Depending on the exact configuration and type of computer system 800, memory 804 may be volatile (such as RAM), non-volatile (such as ROM, flash memory, etc.), or some combination of the two. This most basic configuration of the computer system 800 is illustrated in FIG. 8 by dashed line 806.

Additionally, device 800 may also have additional features/functionality. For example, device 800 includes additional storage 808 (removable and/or non-removable) including, but not limited to, magnetic or optical disks or tape. In embodiments, a traversal algorithm component, a business object tree or policy object tree is stored in storage 808 and loaded into system memory 804 for use by or for execution by the processing unit 802. Computer storage media includes volatile and nonvolatile, removable and non-removable media implemented in any method or technology for storage of information. The information, in embodiments, including computer readable instructions, data structures, program modules, or other data.

Memory 804 and storage 808 are all possible implementations of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage, other magnetic storage devices, or any other medium which is used to store the desired information, for example, the business object tree 100 (FIG. 1) or the policy object tree 200 (FIG. 2), and which is accessed by device 800 and processor 802. Any such computer storage media may be part of device 800.

Device 800 may also contain communications connection(s) 810 that allow the device to communicate with other devices. In embodiments, the communication connections 810 are used to send and/or receive information about the business object tree 100 (FIG. 1), send and/or receive information about the policy object tree 200 (FIG. 2) with a computer system that is accessed over a network, such as the Internet. In embodiments, one or more modules, components, data structures, etc. are encoded onto a modulated data signal for transport to another computer system over the communication connection(s) 810.

In embodiments, device 800 includes a input/output devices 812. Object of interest selections for the traversal algorithm 702 (FIG. 7), in embodiments, are selected with user input device(s) 812, and the policy object associations are displayed with output device(s) 812. Input device(s) 812 are also referred to as user interface selection devices and include, but are not limited to, a keyboard, a mouse, a pen, a voice input device, a touch input device, etc. Output device(s)

812 are also referred to as displays and include, but are not limited to, cathode ray tube displays, plasma screen displays, liquid crystal screen displays, speakers, printers, etc. These devices, either individually or in combination, form the graphical user interface used to display data as described herein. All these devices are well know in the art and need not be discussed at length here.

Computer system 800 typically includes at least some form of computer readable media. Computer readable media can be any available media that can be accessed by processing unit 802. By way of example, and not limitation, computer readable media can be stored on computer storage media. Traversal algorithm and the related components comprise computer readable media or such modules or instructions executable by computer system 800 that may be stored on computer storage medium and other tangible mediums and transmitted in communication media. Computer readable media, in embodiments, includes computer readable instructions, software objects, data structures, program modules, software components, or other data. Combinations of the any of the above should also be included within the scope of computer readable media.

In some embodiments, computer system 800 is part of a network that stores data in remote storage media for use by the computing system 800. In embodiments, a traversal algorithm or risk algorithm component 818 executing on a client system may access the remotely stored data, for example, the business object tree. In other embodiments, the computing system 800 is a desktop or similar computer that stores and operates the traversal algorithm or risk algorithm component 818 on local client data stored in a local storage medium. In still other embodiments, the traversal algorithm or risk algorithm component 818 is executed remotely on a server computer system, wherein compare results are returned to a client computer system but not generated on the client computer system.

Figure 10:
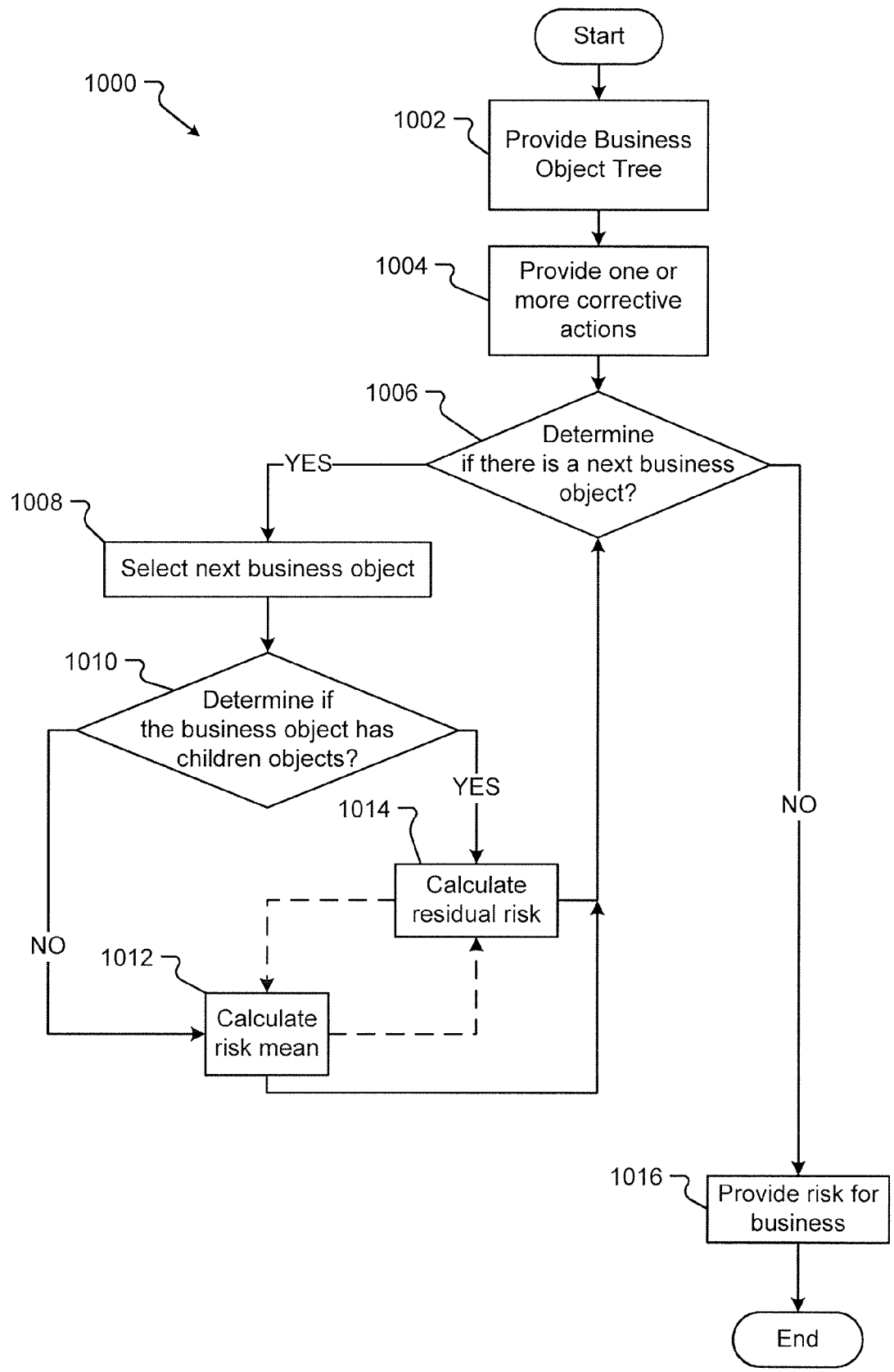
FIG. 10 is a flow diagram of an embodiment of a method for determining risk for a business or particular business objects.

An embodiment of a method 1000 for determining the risk in a business is shown in FIG. 10. A provide operation 1002 provides a business object tree. In embodiments, the provision of the business object tree 100 (FIG. 1) is as described in conjunction with FIG. 9. The business object tree 100 (FIG. 1) includes one or more business objects. A provide operation 1004 provides one or more corrective actions, Each business object, in embodiments, is associated with the one or more deficiencies. Providing deficiencies can be similar to the method for associating policy controls with business objects as described in FIG. 5 and/or FIG. 6.

Determine operation 1006 determines if there is a next business object. A business object tree 100 (FIG. 1) can be analyzed to find the lowest order business objects, which are the business objects at the bottom of the business object tree that have no children objects. From this determination, one of the business objects may be selected to determine the risk associated with that business object. After the first business object, the determine operation 1006, in embodiments, continues to determine if there are other business objects without a risk calculation completed. A risk value may be an attribute of the business object that is searchable by the determine operation 1006. In one embodiment, the determine object 1006 determines if there are any sibling objects to the last identified business object. If there are no sibling objects, the determine operation 1006 can determine if one of the business objects has a parent object that has not been identified. If there is a parent object, the parent business object may have its risk calculated.

The determine operation 1006 continues to identify business objects until it reaches the highest order business object in the business object tree, e.g., the corporate business object 102 (FIG. 1). Determining the risk associated with the highest order business object results in determining the risk for the corporation. As such, if there is another business object for which to calculate a risk, the process flows YES to select operation 1008. If there is no other business object for which to calculate a risk, i.e., the risk for the highest order business object has been calculated, the process flows NO to provide operation 1016.

Select operation 1008 selects the next business object. In embodiments, the select operation selects from one or more business objects determined to need a risk calculated. For example, determine operation 1006 may provide a list of three business objects that need a risk calculation, and the select operation 1008 selects one of the three business objects.

Determine operation 1010 determines if the selected business object has children business objects. If a business object is a lowest order node, the business object would not have children business objects. In contrast, if a business object is not a lowest order node, the business object may have children business objects. In embodiments, determine operation 1010 examines the one or more links associated with the business object. If a link has a child identification of another business object, then the business object has children business objects. A similar function may also be accomplished by analyzing the attributes of the business object to identify child object identifications. If the selected business object does not have children business objects, the process flows NO to calculate operation 1012. If the selected business object does have children business objects, the process flows YES to calculate operation 1014.

Calculate operation 1012 calculates a risk mean. The risk mean calculation is an algorithm that does not dilute the risk associated with a business object. The risk mean calculation may be used with business objects that do not have children business objects. In embodiments, calculate operation 1012 calculates a risk mean associated with each deficiency associated with the business object. The risk associated with each deficiency can be calculated with the values from the deficiency attributes. For example, each deficiency has a strength value or weight value and a risk value related to the degree of enactment. In embodiments, a risk calculation is as follows:

$$f(x) = C * \left( \frac{1}{((R(m) - M) + R + 1)^{\frac{1}{2}}} \right)$$

C is the control effectiveness value for the applicable control, i.e., the strength and weight.

R(m) is the maximum risk value of the possible response set.

M is the risk value of the baseline of the applicable control.

R is the risk value of the response.

In embodiments, the risk for the deficiency is the product of a control effectiveness value multiplied by the quotient of one divided by the sum of a difference between a maximum risk value and a baseline risk value added to a risk value and added to one to the power of one half. For example, an applicable control with a control effectiveness of 0.75, a maximum risk value of 5, a baseline of 3, and a risk value of 2 has a risk associated with the deficiency of 0.3354.

The control effectiveness value, C, is the normalized weight and strength of the control. In embodiments, the control effectiveness value is from 0 to 1, e.g., 0.56. The risk value, R, is, in embodiments, a risk value for how far from fully enacted a deficiency is, e.g., 0 to 5.

The maximum risk value, R(m), is, in embodiments, the highest risk value for the response set of the applicable control. A response set is the number of possible risk values for the applicable control. For example, if the risk may be fully enacted, partially enacted or not enacted, the response set is three (3). Maximum risk, R(m), for the response set is the highest risk value for any one of a number of possible risk values for the applicable control. For example, a control may have two possible values, e.g., no risk or 100% risk. This is a response set of two (2). The maximum risk in this example is 1. In another example, a response set may have five different risk values, e.g., 0, 1, 2, etc. The maximum risk value in this example is 4.

The baseline, M, is, in embodiments, a risk value for the baseline of the applicable control. In other words, the baseline risk, M, is the maximum risk acceptable to the client. For example, a first client may decide that there risk mitigation efforts are less mature and accept a higher amount of risk. Therefore, in the example above with a response set having 5 risk values, the client may decide that a risk value of 2 is the baseline. In another example, a business with a more mature risk mitigation system may only accept a risk of 4 in a response set of 5.

The risk value for each deficiency may then be entered into a risk mean calculation. Again, a risk mean calculation is any algorithm that does not dilute the risk associated with a business object. One example of a risk mean calculation is hereinafter described but embodiments of the present invention should not be limited to this example. In embodiments, the risk mean calculation is as follows:

$$f(x) = \sum \left(\frac{X_n^n}{n}\right)^{\frac{1}{n}}$$

x is the risk associated with the deficiency
n is the number of deficiencies for the business object.

The risk mean is a summation of a quotient of each risk for each deficiency divided by a number of deficiencies for the business object to the power of a quotient of one divided by the number of deficiencies. The risk for the deficiency is, in embodiments, as explained above. The risk mean calculation is not a simple average, which prevents dilution of risk when associating the risk of the one or more deficiencies to the business objects. For example, for a business object with three corrective actions having risks of 0.7906, 0.4, and 0.6, the risk mean for the business object is 0.636. In contrast, if a simple average was used, the risk would be 0.597. Thus, the risk is not diluted.

In embodiments, after calculating the risk mean, the process returns to determine operation 1006. If the process flowed YES to calculate operation 1014, calculate operation 1014 calculates the residual risk. Residual risk is an algorithm that includes the risk of all deficiencies associated with the business object and the risk "rolled-up" or inherited from one or more children business objects. The residual risk algorithm is also a calculation that does not dilute the risk associated with the business object. One example of a residual risk calculation is hereinafter described but embodiments of the present invention should not be limited to this example. An embodiment of the residual risk algorithm is as follows:

$$f(x) = \left(\frac{\sum (f(c_p)^{n+p}) + \sum (f(ca_n)^{n+p})}{n+p}\right)^{\frac{1}{n+p}}$$

$c_p$ is the residual risk for child business object p
$ca_n$ is the residual risk for deficiency n
n is the number of deficiencies for the business object
p is the number of child business objects for the business object.

In embodiments, the residual risk of the business object is a quotient of a summation of the risk for the one or more deficiencies of the business object and a rolled-up risk for each of one or more children business objects divided by a summation of a number of deficiencies for the business object and a number of children business objects to a power of a quotient of one divided by the summation of the number of deficiencies for the business object and the number of children business objects. The residual risk calculation is similar to the risk mean calculation but includes the impact of children business objects on their parent business objects. The risk of the children business objects, $c_p$, is included with the risk, $ca_n$, associated with the deficiencies. In embodiments, the calculate residual risk operation 1014 has the calculate risk mean operation 1012 calculate the impact of the risk for the deficiencies associated with the business object and enters the result of the calculate risk mean operation 1012 into the calculate residual risk operation 1014. For example, for a business object with three deficiencies having risks of 0.7906, 0.4, and 0.6 and three children business objects having risk means of 0.2, 0.5, 0.8, the residual risk for the business object is 0.676. Again, a simple average would dilute the risk for the business object because the average of the risks would be 0.548.

In further embodiments, some relationships, in a DCG, between business objects are cyclical, i.e., a parent business object depends on one of its child business objects, as explained in conjunction with FIG. 1 and FIG. 4. The residual risk operation 1014 includes the risk for the parent in the calculation for the child business object. For example, in FIG. 4, the residual risk for the server 1 object 110 is calculated including the risk rolled-up from the data center 1 object 108. In embodiments, the rolled-up risk associated with data center 1 object 108 is the residual risk of the corrective actions associated with the data center 1 object 108 and the children objects of the data center 1 object 108, excluding the server 1 object 110 residual risk. Once a residual risk for the server 1 object 110 is calculated, the link 114 between the server 1 object 110 and the data center 1 object 108 may be colored. The residual risk for the data center 1 object 108 can then be calculated to include the risk from the server 1 object 110. As such, using the non-dilutive residual risk calculation with the directed cyclical graph, the risk of these cyclical relationships may be better expressed. In contrast, if a simple average of all business objects were used, the cyclical relationships would be ignored, and the risk in the organization would be further diluted or incorrect.

After the calculate operation 1014, the flow returns to the determine operation 1006. If all business objects have had a risk calculated, the provide operation 1016 provides the risk for the business. In embodiments, the highest order business object, e.g., the corporate business object 102 (FIG. 1), is the last business object that has a risk calculated. The risk associated with the highest order business object is the risk for the business. Thus, risk continues to roll-up until the total risk for the business object tree, which represents the business, is determined. Provide operation 1016 provides this risk to a user. In embodiments, the risk is provided as output from a computer system, such as by a display on a monitor or printed to an attached peripheral device.

In embodiments, a business impact factor can be multiplied to the risk for a business object to quantify the impact of the risk on the business. One business unit may have more importance than another business unit. For example, a sales business unit is more important than a human resources business unit because without the sales business unit, the business cannot generate income. As such, the risk associated with the sales business unit may be more important than the risk associated with the human resources business unit. To quantify the different impacts of risk on different business objects, a business impact factor can be multiplied by the risk. Then, the risk may be rolled-up.

Further embodiments of the risk assessment method 1000 include evaluating the risk associated with one or more business objects with a set standard. For example, if a business object has a risk of less than 20%, then the business object may be assumed to be a low risk business object. Likewise, if the risk is between 20% and 70%, the business object may be a medium risk object, while any risk over 70% may be a high risk business object. The number of different levels of risk is predetermined by a client and may be two or more levels. In addition, the level of risk for a business object is associated, in embodiments, with the business object in the business object tree. For example, a display of the business objects may be coded by a color to show the level of risk for each business object, e.g., low risk business objects are green, medium risk business objects are yellow, and high risk business objects are red. The color or coded level of risk for the business object may be an attribute of the business object.

In still further embodiments, a business object tree may be traversed and risk calculated for only a predetermined type of business object, type of deficiency (policy control), or type of link. Embodiments of either the business objects, deficiencies, or links have attributes describing the type of business object or type of link. For example, a business object, deficiency, or link may have a "facilities" attribute specifying that the business object, deficiency, or link is of the type "facilities." The business object tree provided for risk assessment may have business objects of only the predetermined type. By traversing the business object tree using the type attributes, risk for certain types of business objects may be calculated. As such, each business object may have a risk for only a certain type of deficiencies, which can be specified.

Figure 11:
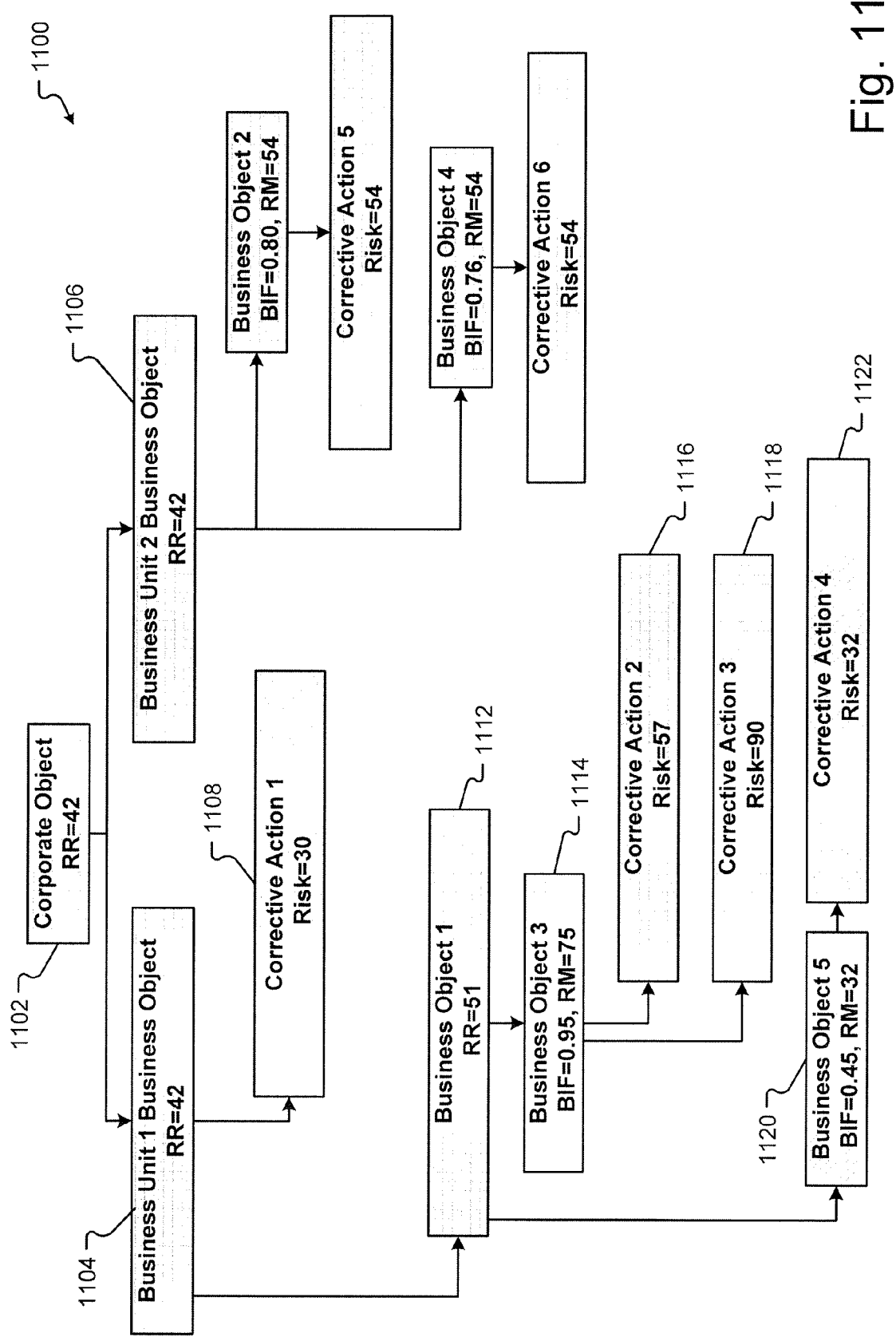
FIG. 11 is a block diagram of an embodiment of a business object tree showing an example of risk determination and risk roll-up that determines the risk associated with a business or particular business objects.

To further illustrate the determination of risk for a business, an example of a risk calculation for a business is shown in FIG. 11. The business is modeled as a business object tree 1100 with the highest order business object the corporate business object 1102. Below the corporate business object 1102 are two business unit business objects 1104 and 1106, which represent two business units in the corporation, for example, the sales business unit and the manufacturing business unit. The business object tree 1100 contains several different arrangements of business objects and corrective actions below the business unit business objects 1104 and 1106.

Each deficiency, e.g., deficiency 1 1108, includes a risk value. The deficiency risk value, in embodiments, is calculated with the risk formula described in conjunction with FIG. 10, which is as follows:

$$f(x) = C * \left( \frac{1}{((R(m) - M) + R + 1)^{\frac{1}{2}}} \right)$$

For example, the risk for deficiency 1 is approximately 0.3354, with a control effectiveness value of 0.75, a maximum risk value of 5, a baseline of 3, and a risk value of 2. The calculation is as follows:

$$f(x) = .75 * \left( \frac{1}{((5 - 3) + 2 + 1)^{\frac{1}{2}}} \right)$$

$$f(x) = .75 * \left( \frac{1}{\sqrt{5}} \right)$$

$$f(x) = .75 * \left( \frac{1}{2.236} \right)$$

$$f(x) = .75 * .447$$

$$f(x) \approx .3354$$

The deficiencies in FIG. 11 have risks derived from similar calculations.

In embodiments, the risks for the deficiencies are attributed to the business objects for which the deficiencies are associated. If a business object has only a single deficiency, the risk for the deficiency is also the risk for the business object. For example, the risk for deficiency 4 1122 is the same as the risk mean (RM) for business object 5 1120. If a business object has more than one associated deficiency, the risk mean for the deficiencies is the risk for the business object. For example, the risk associated with business object 3 1114 is the risk mean of deficiency 2 1116 and deficiency 3 1118. The risk mean may be calculated with the algorithm described in conjunction with FIG. 10. For example, the risk mean for business object 3 1114 is approximately 0.75, when the risk for deficiency 2 1116 is 0.57 and the risk for deficiency 3 1118 is 0.90, and is calculated as follows:

$$f(x) = \sum \left( \frac{X_n^n}{n} \right)^{\frac{1}{n}}$$

$$f(x) = \left( \frac{(.57^2 + .90^2)}{2} \right)^{\frac{1}{2}}$$

$$f(x) = \left( \frac{(.3249 + .8100)}{2} \right)^{\frac{1}{2}}$$

$$f(x) = \left( \frac{1.1349}{2} \right)^{\frac{1}{2}}$$

$$f(x) \approx (.5674)^{\frac{1}{2}}$$

$$f(x) \approx .75$$

Risks for other business objects, having two or more deficiencies, may be calculated similarly.

For a business object with children business objects, the risk associated with the business object is the residual risk of the deficiencies associated with the business object and children business objects related to the business object. An example business object with a residual risk is the business unit 1 business object 1104. The residual risk associated with the business unit 1 business object 1104 is a function of the risk for deficiency 1 1108 and the risk for business object 1 1112. The residual risk can be calculated using the algorithm as explained in conjunction with FIG. 10. The residual risk for business unit 1 business object 1104 is 0.42, when the risk for deficiency 1 1108 is 0.30 and the risk for business object 1 1112 is 0.51. It should be noted that the number of children, p, is one (1) and the number of deficiencies, n, is also one (1). The residual risk, in this example, is calculated as follows:

$$f(x) = \left( \frac{\sum (f(c_p)^{n+p}) + \sum (f(ca_n)^{n+p})}{n+p} \right)^{\frac{1}{n+p}}$$

$$f(x) = \left( \frac{(.51)^{1+1} + (.30)^{1+1}}{1+1} \right)^{\frac{1}{1+1}}$$

$$f(x) = \left( \frac{(.2601 + .0900)}{2} \right)^{\frac{1}{2}}$$

$$f(x) = \left( \frac{.3501}{2} \right)^{\frac{1}{2}}$$

$$f(x) \approx (.1750)^{\frac{1}{2}}$$

$$f(x) \approx .42$$

The residual risk value for the corporate object is also the risk associated with the entire business.

In embodiments, a business impact factor (BIF) may also be used to adjust the risk in the business object tree to reflect the impact of the risk on important functions of the business. For example, business object 3 1114 has a BIF of 0.95, which means that risk to business object 3 has a greater impact on the organization. In contrast, business object 5 1120 has a BIF of only 0.45. Thus, risk to business object 5 1120 has a much lower impact on the business. The risk means or residual risk of an object may be multiplied by the BIF to adjust the risk for impact to the business. For example, sales may have a higher impact and have a BIF of 0.95, while human resources would have a BIF of 0.45.

In still further embodiments, the objects are coded to indicate the amount of risk associated with each object. For example, if a business object has a risk below 0.40, the business object would have low risk and be colored green, as shown with business object 5 1120, deficiency 4 1122, and deficiency 1 1108. If the business object had medium risk, e.g., between 0.40 and 0.70, the business object is colored yellow, as with business object 1 1112. Finally, if the business object has a high risk, e.g., risk above 0.70, the business object is colored red, as with business object 3 1114. Other coding levels or formats are possible. For example, other visual codes may be bold lettering or objects, increase in the size of font, etc.

Although the embodiments have been described in language specific to structural features, methodological acts, and computer-readable media containing such acts, it is to be understood that the possible embodiments, as defined in the appended claims, are not necessarily limited to the specific structure, acts, or media described. One skilled in the art will recognize other embodiments or improvements that are within the scope and spirit of the present invention. Therefore, the specific structure, acts, or media are disclosed only as illustrative embodiments. The invention is defined by the appended claims.

What is claimed is:

1. A computer storage medium encoding a computer program of instructions for executing a computer implemented method for determining a risk in an organization, the method comprising:
    providing a business object tree, the business object tree including one or more business objects;
    providing one or more deficiencies associated with one or more business objects;
    determining if a business object has one or more children business objects;
    if the business object does not have one or more children business objects, calculating the risk mean for one or more risks for one or more deficiencies associated with the business object;
    if the business object does have one or more children business objects, calculating the residual risk of the business object; and
    providing either the risk mean or the residual risk for the business object.

2. The computer readable medium of claim 1, wherein a risk for a deficiency is calculated as follows:

$$f(x) = C * \left( \frac{1}{((R(m) - M) + R + 1)^{\frac{1}{2}}} \right)$$

wherein, C is a control effectiveness value for an applicable control associated with a business object,
R(m) is a maximum risk value of a possible response set,
M is a risk value of a baseline of the applicable control, and
R is a risk value of a response.

3. The computer readable medium of claim 2, wherein the risk mean is calculated as follows:

$$f(x) = \sum \left( \frac{X_n^n}{n} \right)^{\frac{1}{2}}$$

wherein, x is a risk associated with a deficiency, and
n is a number of deficiencies for a business object.

4. The computer readable medium of claim 3, wherein the residual risk of the business object is calculated as follows:

$$f(x) = \left( \frac{\sum (f(c_p)^{n+p}) + \sum (f(ca_n)^{n+p})}{n+p} \right)^{\frac{1}{n+p}}$$

wherein, $c_p$ is a residual risk for child business object p,
$ca_n$ is a residual risk for deficiency n,
n is a number of deficiencies for a business object, and
p is a number of child business objects for the business object.

5. The computer readable medium of claim 1, further comprising:
    coding one or more objects with a level of risk; and
    providing the one or more objects with the coding.

6. The computer readable medium of claim 5, wherein the coding is a coloring of the one or more business objects.

7. The computer readable medium of claim 5, wherein the level of risk is one of low, medium, or high.

8. The computer readable medium of claim 1, further comprising multiplying the residual risk of a business object with a business impact factor associated with the business object.

9. The computer readable medium of claim 1, wherein providing the business object tree comprises:
   determining one or more business objects of a predetermined type; and
   providing the business object tree including only the one or more business objects of the predetermined type.

10. The computer readable medium of claim 1, further comprising:
    determining the residual risk for a highest order business object; and
    providing the residual risk of the highest order business object as a risk for the organization.

11. A computer readable medium, executable on a computing system, including at least one tangible medium and encoding a computer program of instructions for executing computer implemented components that determine a risk for a business, the components comprising:
    a control group, the control group listing one or more policy controls;
    a policy object database, the policy database having one or more pointers to the control group, the policy database associating one or more policy objects with one or more policy controls;
    a business object database, the business object database having one or more pointers to the policy database, the business object database associating one or more business objects with one or more policy objects;
    a traversal algorithm, the traversal algorithm traversing the business object database for one or more business object of interests to determine one or more ancestral objects, the traversal algorithm traversing the policy object database to determine the one or more associated policy objects associated with the business object of interest or the ancestral objects, the traversal algorithm determining the one or more policy controls associated with the associated policy objects and to associate the one or more policy controls with the business object of interest; and
    a risk algorithm component, the risk algorithm component selecting the one or more policy controls to determine a risk associated with a policy control, the risk algorithm component rolling-up the risk associated with the one or more policy controls to one or more business objects without diluting the risk associated with the one or more policy controls associated with the business object.

12. The computer readable medium of claim 11, the risk algorithm rolling-up the risk of the policy control to a business object.

13. The computer readable medium of claim 12, the risk algorithm rolling-up the risk of the business object to a parent business object.

14. The computer readable medium of claim 11, the risk algorithm rolling up the risk of one or more child business objects to a risk for a highest order business object and providing the risk of the highest order business object as the risk for the business.

15. A computer readable medium, readable by a computing system, including at least one tangible medium and having stored thereon a data structure read by a computer to determine risk associated with a business, the data structure comprising:
    a control policy data element, the control policy data element including one or more identifications of one or more business objects and one or more identifications of deficiencies associated with the one more business objects;
    a business object data element, the business object data element including one or more business objects in a business object tree, the business object tree being a directed cyclical graph;
    a policy object data element, the business object data element including one or more deficiencies; and
    wherein, a computing system reads the policy object data element to determine a risk for the one or more deficiencies, the computing system reads the control policy data element to roll-up the risk for the one or more deficiencies to the one or more associated business objects, the computing system reads the business object data element to roll-up the risk of the one or more business objects to one or more higher order business objects in the business object tree, the computing system providing a risk for the highest order business object as the risk for the business.

16. The computer readable medium of claim 15, wherein the policy object data element comprises an attribute field, the attribute field including one or more attributes for the deficiency.

17. The computer readable medium of claim 16, wherein the attribute field comprises:
    a risk value associated with the deficiency;
    a risk strength and weight associated with the deficiency; and
    wherein the risk value, risk strength, and risk weight are read to calculate the risk for the deficiency.

18. The computer readable medium of claim 15, wherein the business object data element comprises:
    an identification field, the identification field identifying the business object; and
    an attribute field, the attribute field including one or more attributes for the business object.

19. The computer readable medium of claim 18, wherein the attribute field comprises:
    if the business object does not have a child business object, a risk mean value, the risk mean value calculated from the risks associated with one or more associated deficiencies; and
    if the business object does have a child business object, a residual risk value, the residual risk value calculated from the risks associated with one or more associated deficiencies and the risk mean values of one or more children business objects.

20. The computer readable medium of claim 19, wherein the attribute field comprises a business impact factor, the business impact factor multiplied to the residual risk value to adjust the residual risk value of the business object to reflect an impact of the risk on a business.

* * * * *